United States Patent
Furlani et al.

(10) Patent No.: US 6,384,959 B1
(45) Date of Patent: May 7, 2002

(54) OPTICAL DATA MODULATION SYSTEM WITH SELF-DAMPED ELECTROMECHANICAL CONFORMAL GRATING

(75) Inventors: Edward P. Furlani, Lancaster; Marek W. Kowarz, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/757,341

(22) Filed: Jan. 9, 2001

(51) Int. Cl.[7] ............................................... G02B 26/00
(52) U.S. Cl. ...................... 359/291; 359/290; 359/292; 359/295; 359/572; 359/573; 359/231
(58) Field of Search ................................ 359/290, 291, 359/292, 295, 572, 573, 224, 230, 231, 248, 187

(56) References Cited

U.S. PATENT DOCUMENTS

| | | | |
|---|---|---|---|
| 5,311,360 A | 5/1994 | Bloom et al. | 359/572 |
| 5,459,610 A | 10/1995 | Bloom et al. | 359/572 |
| 5,661,592 A | 8/1997 | Bornstein et al. | 359/291 |
| 5,677,783 A | 10/1997 | Bloom et al. | 359/224 |
| 5,841,579 A | 11/1998 | Bloom et al. | 359/572 |
| 6,307,663 B1 * | 10/2001 | Kowarz | 359/231 |

OTHER PUBLICATIONS

"Equivalent–Circuit Model of the Squeezed Gas Film in a Silicon Accelerometer", by Timo Veijila et al., Sensors and Actuators A 48, 1995. pp. 239–248.

"Theory and Simulation of Viscous Damped Reflection Phase Gratings," by E. Furlani, J. Phys, D: Appl. Phys, 32 (4) 1999. pp. 412–416.

* cited by examiner

Primary Examiner—Georgia Epps
Assistant Examiner—Tuyen Tra
(74) Attorney, Agent, or Firm—Raymond L. Owens

(57) ABSTRACT

A system for modulating a beam of light in accordance with an input data stream having a data rate greater than 2 MHz, includes a source of light for directing light along a predetermined path, and a self-damped electromechanical conformal grating disposed in the predetermined path, the self-damped electromechanical conformal grating. The self-damped electromechanical conformal grating includes an elongated ribbon element including a light reflective surface, a substrate and a pair of end supports for supporting the elongated ribbon element at both ends over the substrate; and at least one intermediate support between the end supports so that there are deformable portions of the elongated ribbon element above and movable into a channel containing a gas.

6 Claims, 8 Drawing Sheets

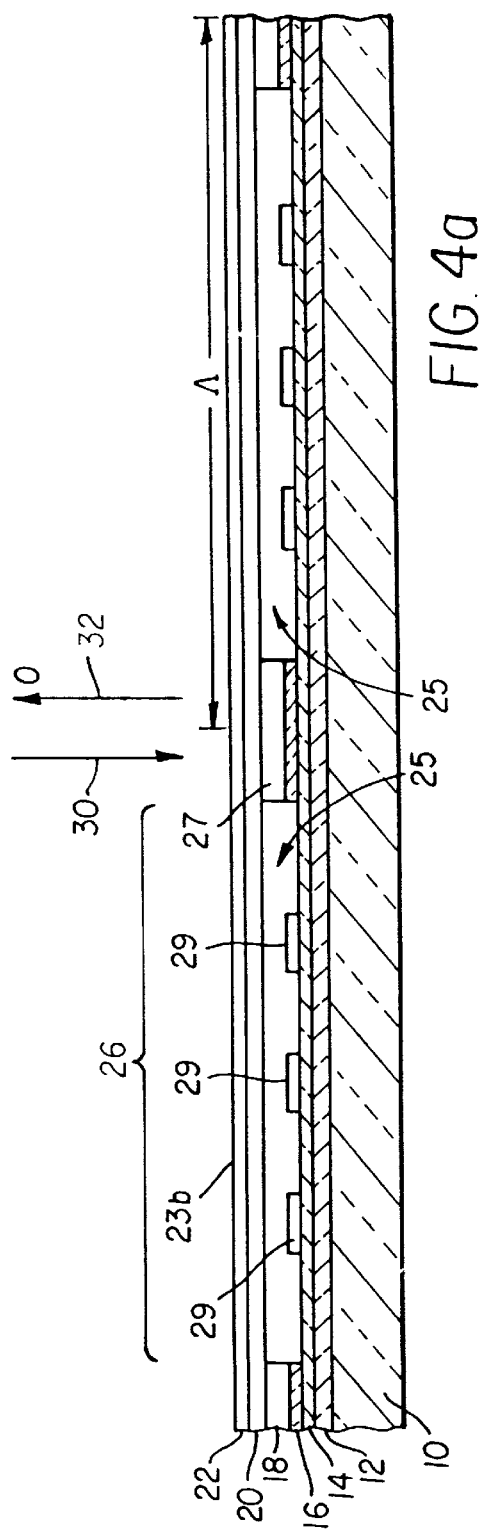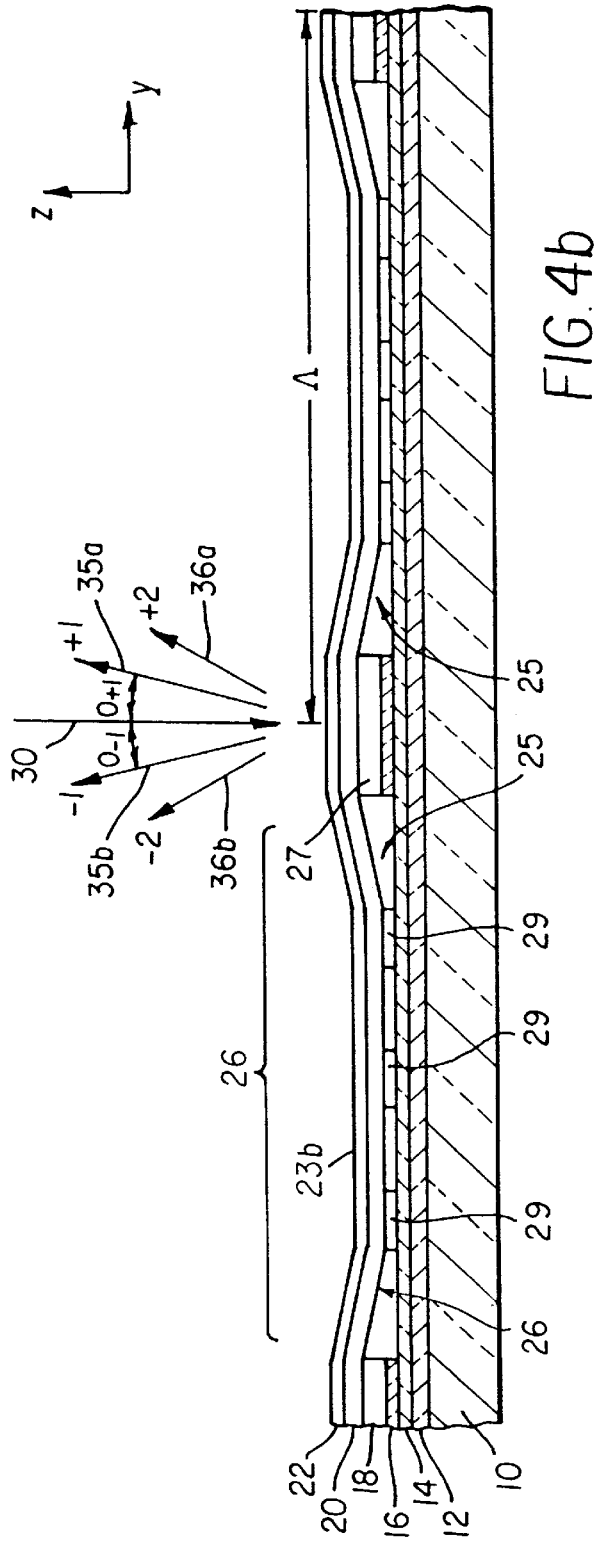

OPTICAL DATA MODULATION SYSTEM WITH SELF-DAMPED ELECTROMECHANICAL CONFORMAL GRATING

CROSS REFERENCE TO RELATED APPLICATION

Reference is made to commonly assigned U.S. patent application Ser. No. 09/757,340 filed concurrently herewith, entitled "Optical Data Modulation System With Self-Damped Diffractive Light Modulator" by Kowarz et al, the disclosure of which is incorporated herein.

FIELD OF THE INVENTION

The present invention relates to the modulation of optical signals, and more particularly, to an optical modulation system which includes a self-damped electromechanical conformal grating.

BACKGROUND OF THE INVENTION

High-speed optical data modulation systems are used for various applications including optical data storage and communications. These systems require data throughput in the megahertz frequency range. Substantial progress has been made in the development and implementation of microelectro-mechanical (MEMS) light modulators that operate efficiently at these frequencies. MEMS light modulators with a variety of designs have been used in applications such as display, optical processing, printing, optical data storage and spectroscopy. These light modulators produce spatial variations in the phase and/or amplitude of an incident light beam using arrays of individually addressable elements. For example, high-speed reflective phase gratings have been fabricated using suspended micromechanical ribbon elements, as described in U.S. Pat. No. 5,311,360 to Bloom et al. This device, also known as a grating light valve (GLV), can be fabricated with CMOS-like processes on silicon. Bloom et al. described a similar device in U.S. Pat. No. 5,459,610, with changes in the structure that included: 1) patterned raised areas beneath the ribbons to minimize contact area to obviate stiction between the ribbon and substrate; 2) an alternative device design in which the spacing between ribbons was decreased and alternate ribbons were actuated to produce good contrast; 3) solid supports to fix alternate ribbons; and 4) an alternative device design that produced a blazed grating by rotation of suspended surfaces. Bloom et al in U.S. Pat. No. 5,677,783 also presented a method for fabricating the device. Additional improvements in the design and fabrication of the GLV were described in U.S. Pat. No. 5,841,579 to Bloom et al. and in U.S. Pat. No. 5,661,592 to Bornstein et al.

A completely different class of electromechanical grating devices may be obtained by defining a grating structure in the supports below elongated ribbon elements, as disclosed in commonly-assigned U.S. Ser. No. 09/491,354 filed Jan. 26, 2000 entitled "Spatial Light Modulator With Conformal Grating Elements" by Mark W. Kowarz. These devices, which are referred as electromechanical conformal gratings, function on the principle of a hidden grating. In the unactuated state, the grating structure is completely hidden from view and the device functions as a mirror. In the actuated state, the elongated ribbon elements deform to reveal the grating structure of the supports, thus generating a partially conformal diffraction grating. The operation of a electromechanical conformal grating is based on an attractive electrostatic force, which is produced by a voltage difference between a ground plane and the conducting layer on elongated ribbon elements. This attractive force changes the heights of the deformable portions of the elongated ribbon elements relative to the substrate. Modulation of the diffracted optical beam is obtained by appropriate choice of the voltage waveform. The voltage needed to deform a ribbon a certain distance depends on several factors including the tensile stress in the ribbon element, the length of the deformable portions of the ribbon and the distance between the ground plane and the top conductive layer.

The resonant frequency of the deformable portions of the elongated ribbon elements depends primarily on their tensile stress, density, and length. When a ribbon is actuated or released, the deformable portions ring at their resonant frequency, which is typically between 1 and 15 MHz. The mechanical response of the deformable portions of the elongated ribbon elements is damped by the flow and compression of the layer of gas beneath the ribbons. This phenomenon is referred to as squeeze film damping. It depends on the type of gas present, the pressure, film thickness etc. This damping determines the width of the resonant peak associated with the resonant frequency of the ribbons. As a result of this resonant ringing, the maximum frequency at which an electromechanical conformal grating can be operated is limited, and the diffracted light intensity contains undesirable temporal variations. These temporal variations in a data stream give rise to undesired data errors. Therefore, there is a need for an electromechanical conformal grating having increased operating speed and reduced temporal light intensity variations.

SUMMARY OF THE INVENTION

It is an object of the present invention to provide an optical modulation system with a self-damped electromechanical conformal grating for a beam of light in accordance with an input data stream that is particularly suitable for input data rates greater than 2 MHz.

This object is achieved by a system for modulating a beam of light in accordance with an input data stream having a data rate greater than 2 MHz, comprising:
(a) a source of light for directing light along a predetermined path;
(b) a self-damped electromechanical conformal grating disposed in the predetermined path, the self-damped electromechanical conformal grating including:
  (i) an elongated ribbon element including a light reflective surface,
  (ii) a substrate and a pair of end supports for supporting the elongated ribbon element at both ends over the substrate; and
  (iii) at least one intermediate support between the end supports so that there are deformable portions of the elongated ribbon element above and movable into a channel containing a gas; and
(c) means responsive to the input data stream for applying forces to the an elongated ribbon element to cause the deformable portions of the elongated ribbon element to move into the channel so that the deformable portions of the elongated ribbon element are movable between first and second positions in accordance with the input data stream; and
(d) the self-damped electromechanical conformal grating modulating the light beam and directing the modulated light to a light utilization device where the modulated light can be recorded or decoded, the deformable portions of the elongated ribbon element being sufficiently damped to minimize the introduction of data errors into the modulated light beam.

In accordance with the present invention an optical data modulation system with a self-damped electromechanical conformal grating suitable for 2 MHz data rates is disclosed. The system represents a significant improvement over existing technology in terms of its data throughput, reliability, and manufacturability. The modulator system can readily be optimized at standard ambient conditions which substantially simplifies fabrication and packaging, and reduces per unit costs.

BRIEF DESCRIPTION OF THE DRAWINGS

FIGS. 4a and 4b are cross-sectional views through line 3—3 in FIG. 4 showing the device in an unactuated state and an actuated state, respectively;

DETAILED DESCRIPTION OF THE INVENTION

Figure 1:
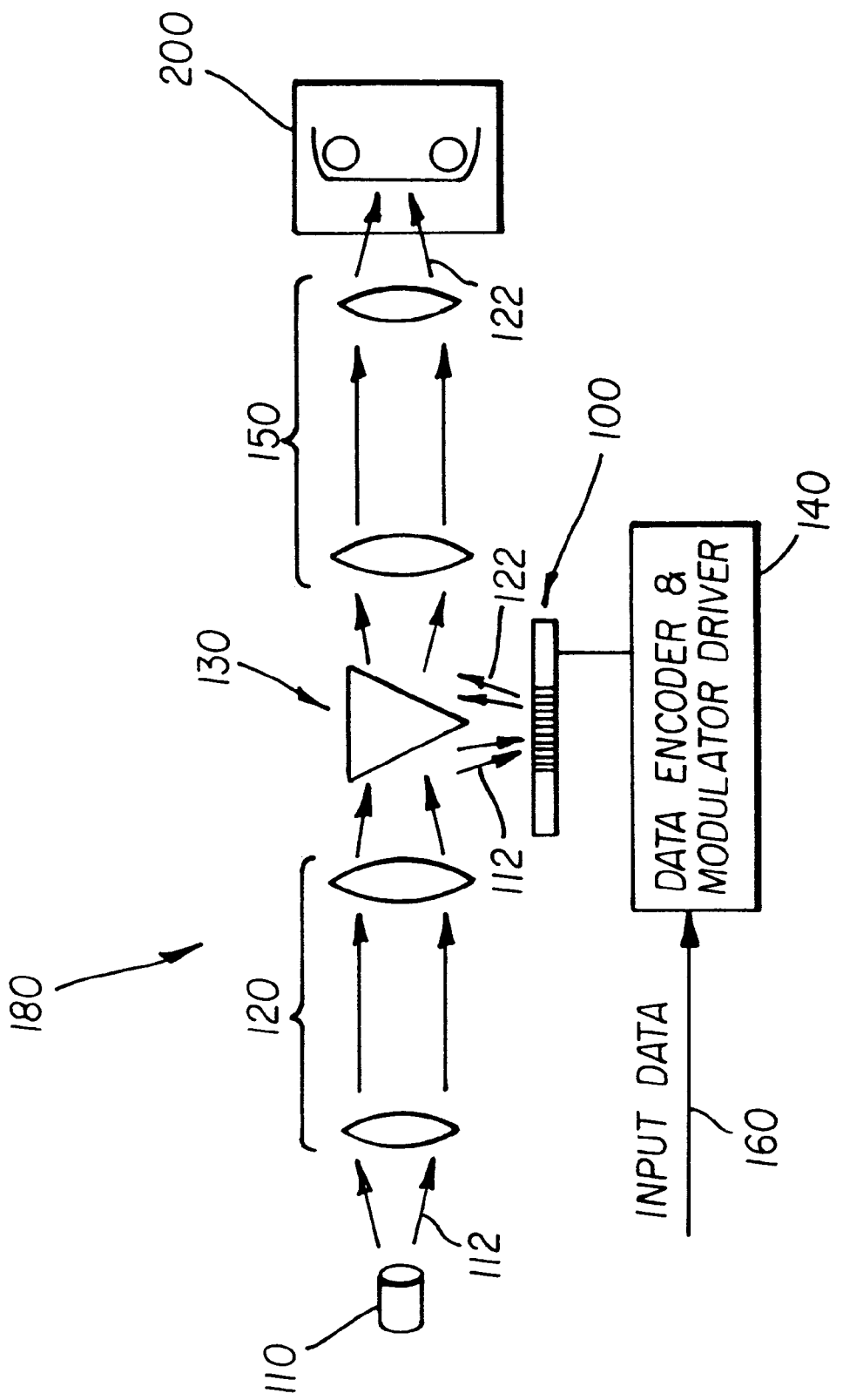
FIG. 1 is a schematic of the optical data modulation system of the present invention used for an optical data storage application.

FIG. 1 shows a schematic of and optical data modulation system 180 of the present invention used for an optical data storage application. The optical data modulation system 180 includes a light source 110, an optical system 120, a light directing element 130, a data encoder and modulator driver 140, a self-damped electromechanical conformal grating 100, an optical system 150, and a light utilization device 200. The light source 110 is preferably a laser or LED. The light directing element 130 is preferably a mirrored prism.

The operation of the optical data modulation system 180 is as follows: Light 112 from the light source 110 is focused by the optical system 120 onto the light directing element 130 which directs the light 112 onto the self-damped electromechanical conformal grating 100. The data encoder and modulator driver 140 activates the self-damped electromechanical conformal grating 100 to modulate the incident light in accordance with an input data stream 160. The modulated light 122 leaves the self-damped electromechanical conformal grating 100 and is incident on the light directing element 130. The light directing element 130 directs the modulated light 122 onto the optical system 150. The optical system 150 focuses the modulated light 122 onto a light utilization device 200, which in this embodiment is a high-speed data storage system. Specifically, in this embodiment the light utilization device 200 is an optical data recorder which uses an optically sensitive storage media that consists of a movable light sensitive surface which records data in response to the modulated light 122. In this way, the input data 160 is stored in a digital format on an optically sensitive storage media for subsequent retrieval and use. The optical data modulation system 180 is particularly suitable for operation at data rates above 2 MHz.

Figure 2:
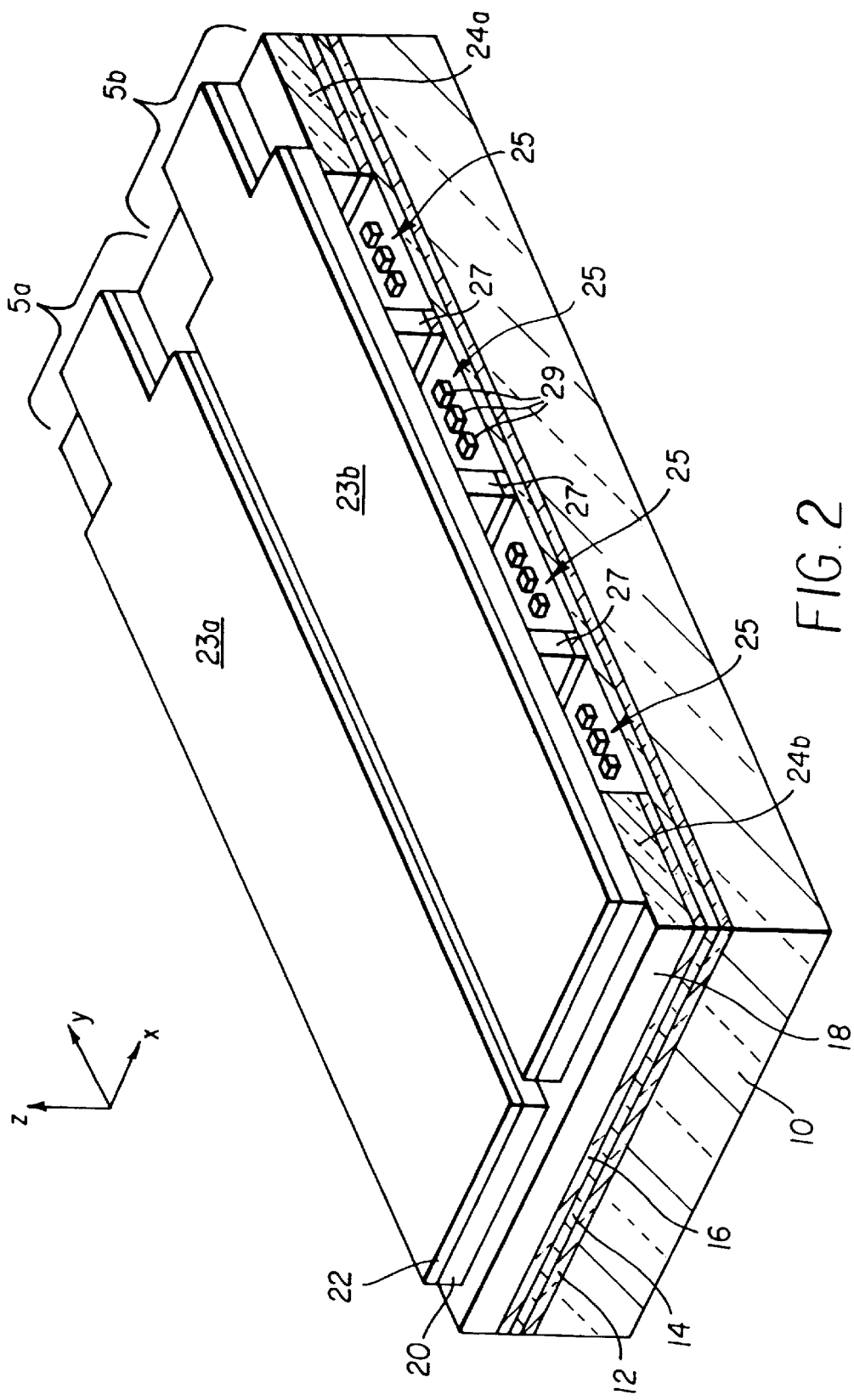
FIG. 2 is a partially cut-away perspective of the conformal grating device showing two conformal grating elements in a linear array.

FIGS. 2 through 7 illustrate the structure and operation of the electromechanical conformal grating 100. FIG. 2 shows the structure of two side-by-side conformal grating elements 5a and 5b in an unactuated state. The term conformal refers to the fact that the grating elements 5a and 5b conform to the shape of their support structure (substrate and supports) upon activation. In this embodiment, these devices can be operated by the application of an electrostatic force. The conformal grating elements 5a and 5b are formed on top of a substrate 10, made of glass, metal, plastic or semiconductor materials, that is covered by a bottom conductive layer 12 which acts as an electrode to actuate the devices. The bottom conductive layer 12 can be made of materials such as aluminum, titanium, gold, silver, tungsten, doped silicon or indium tin oxide. The bottom conductive layer 12 is covered by a dielectric protective layer 14 followed by a spacer layer 18. On top of the spacer layer 18, a ribbon layer 20 is formed which is covered by a reflective layer 22. In the present embodiment, the reflective layer 22 is also a conductor in order to provide electrodes for the actuation of the conformal grating elements 5a and 5b. The reflective and conductive layer 22 is patterned to provide electrodes to the two conformal grating elements 5a and 5b. The ribbon layer 20 preferably includes a material with a sufficient tensile stress to provide a large restoring force. Examples of ribbon materials are silicon nitride, titanium aluminide, and titanium oxide. The thickness and tensile stress of the ribbon layer 20 are chosen to optimize performance by influencing the electrostatic force for actuation and the restoring force. These forces affect the voltage requirement, speed and resonance frequency of the conformal grating elements 5a and 5b.

Each of the two devices 5a and 5b has an associated elongated ribbon element 23a and 23b, respectively, patterned from the reflective and conductive layer 22 and the ribbon layer 20. The elongated ribbon elements 23a and 23b are supported by end supports 24a and 24b formed from the spacer layer 18 and by one or more intermediate supports 27. In FIG. 2, three intermediate supports 27 are shown formed from the spacer layer 18. These intermediate supports 27 are uniformly separated in order to form four equal-width channels 25. The elongated ribbon elements 23a and 23b are secured to the end supports and to the intermediate supports 27. The end supports 24a and 24b are not defined other than at their edges facing the channel 25. A plurality of square standoffs 29 is patterned at the bottom of the channels 25 from the standoff layer 16. These standoffs 29 reduce the possibility of the deformable portions 26 of the elongated ribbon elements 23 sticking when actuated. The standoffs may also be patterned in shapes other than square for example rectangular or round.

Figure 3:
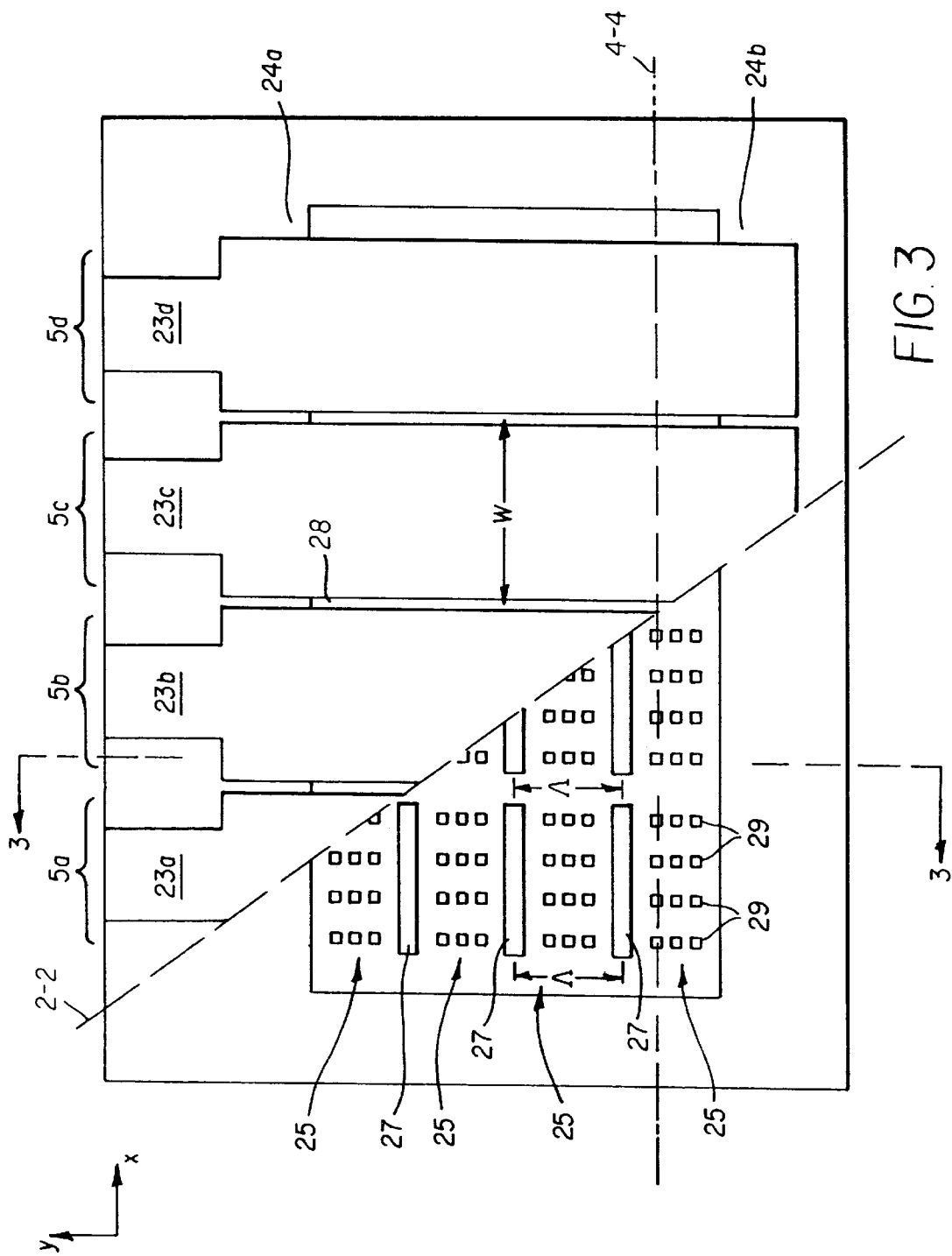
FIG. 3 is a top view of the conformal grating device, showing four grating elements in a linear array.

A top view of a four-device linear array of conformal grating elements 5a, 5b, 5c and 5d is shown in FIG. 3. The elongated ribbon elements 23 are depicted partially removed over the portion of the diagram below the line 2—2 in order to show the underlying structure. For best optical performance and maximum contrast, the intermediate supports 27 must be completely hidden below the elongated ribbon elements 23a, 23b, 23c and 23d. Therefore, when viewed from the top, the intermediate supports must not be visible in the gaps 28 between the conformal grating elements 5a–5d. Here, each of the conformal grating elements 5a–5d have three intermediate supports 27 with four equal-width channels 25.

The center-to-center separation Λ of the intermediate supports 27 defines the period of the conformal grating elements 5a–5d in the actuated state. The elongated ribbon elements 23a–23d are mechanically and electrically isolated from one another, allowing independent operation of the four conformal grating elements 5a–5d. The bottom conductive layer 12 of FIG. 2 can be common to all of the devices.

FIG. 4a is a side view, through line 3—3 of FIG. 3, of two channels 25 of the conformal grating element 5b in the unactuated state. FIG. 4b shows the same view of the actuated state. For operation of the device, an attractive electrostatic force is produced by applying a voltage difference between the bottom conductive layer 12 and the reflective conductive layer 22 of the elongated ribbon element 23b. In the unactuated state (see FIG. 4a), with no voltage difference, the ribbon element 23b is suspended flat between the supports 24a and 24b. In this state, an incident light beam 30 is primarily reflected 32 into the mirror direction. To obtain the actuated state, a voltage from an input data stream is applied to the conformal grating element 5b, which applies a force to the elongated ribbon element 23b to cause the deformable portions 26 of the elongated ribbon element 23b to move into the channel 25 so that the deformable portions 26 are movable between first and second positions in accordance with the input data stream and produce a partially conformal grating with period Λ. FIG. 4b shows the device in the fully actuated state with deformable portions 26 the elongated ribbon element 23b in contact with the standoffs 29. The height difference between the bottom of element 23b and the top of the standoffs 29 is chosen to be approximately ¼ of the wavelength λ of the incident light. The optimum height depends on the specific shape of the actuated device. In the actuated state, the incident light beam 30 is primarily diffracted into the +1$^{st}$ order 35a and −1$^{st}$ order 35b, with additional light diffracted into the +2$^{nd}$ order 36a and −2$^{nd}$ order 36b. A small amount of light is diffracted into even higher orders and some is reflected. For light incident perpendicular to the surface of the device, the angle $\theta_m$ between the incident beam and the m'th order diffracted beam is given by $$\sin \theta_m = m\lambda/\Lambda,$$

where m is an integer. One or more of the diffracted orders can be collected and used by the optical system, depending on the application. When the applied voltage is removed, the forces due to the tensile stress and bending restores the deformable portions 26 of the elongated ribbon element 23b to their original unactuated state.

Figure 5:
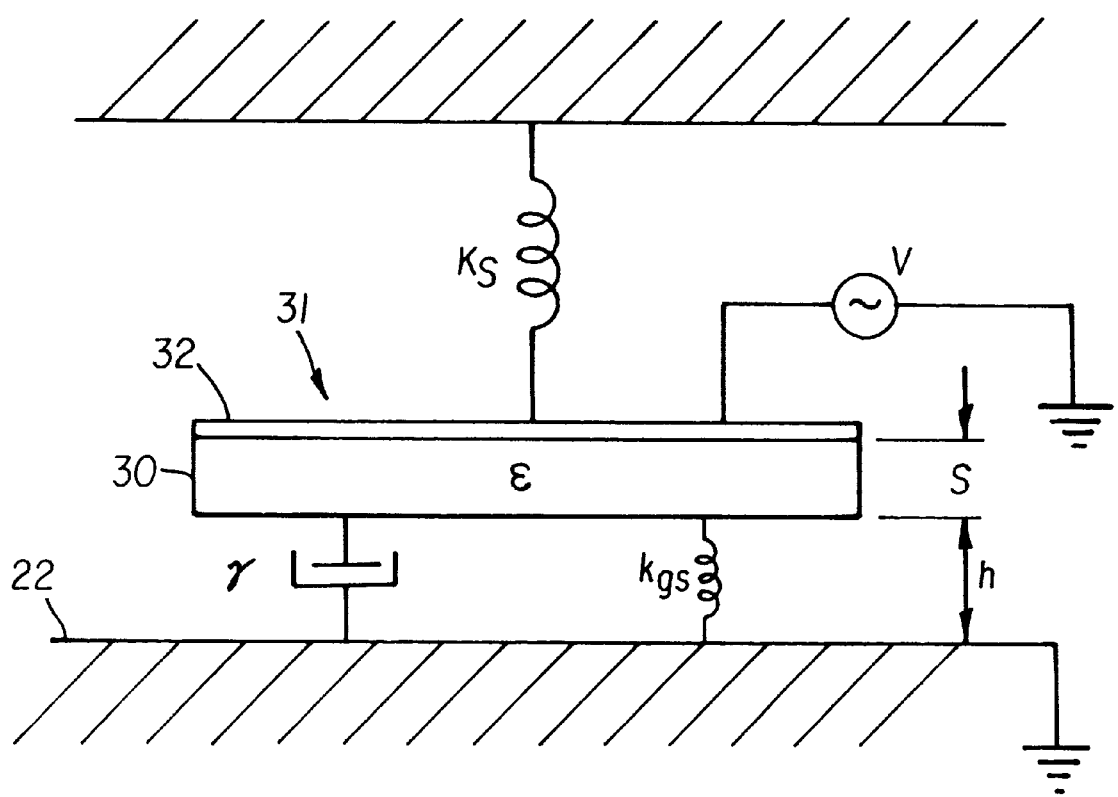
FIG. 5 is a damped spring-mass system that serves as a model for the transient behavior of a deformable portions of the elongated ribbon elements.

Referring to FIGS. 2, 3, 4, and 5, the deformable portions 26 of the elongated ribbon elements 23 of the self-damped electromechanical conformal grating 100 can be modeled as a damped-spring- mass system (see E. P. Furlani, "Theory and Simulation of Viscous Damped Reflection Phase Gratings," J. Phys. D: Appl. Phys, 32 (4), 1999). Referring to FIG. 5, the motion the center of the deformable portions 26 of the elongated ribbon elements 23 is described by the following differential equation, $$\frac{d^2 y}{dt^2} = F_e(y) - \gamma \frac{dy}{dt} - (K_s + k_{gs})y$$

where y(t) is the vertical displacement of the center of the deformable portions 26 of the elongated ribbon elements 23 from their un-actuated (up) position, $F_e(y)$ is the electrostatic force of attraction, $K_s$, is the spring constant the deformable portions 26, and γ, and $k_{gs}$ are damping and spring constants due to squeeze film effects as described below. The electrostatic force is given by $$F_e(y) = K_e \frac{V^2}{[\varepsilon_0 s + \varepsilon(h-y)]^2}, \quad \text{where}$$

$$K_e = \frac{\varepsilon^2 \varepsilon_0 A}{2},$$

and A=wL, V is the voltage applied between the bottom conductive layer 12 and the reflective conductive layer 22 on the elongated ribbon elements 23, $\in_0$ and $\in$ are the permittivities of free space and the ribbon material 30, respectively, L is the length of the ribbon, h is the height of the channel 25, and y is the displacement of the center of the deformable portions of elongated ribbon elements 23 from their un-activated position. The ribbon spring constant $K_s$ is given by $$K_s = \frac{4T}{L},$$

where $T=T_s ws$, and $T_s$, w and s are the tensile stress, width and thickness of the the ribbon layer 20, respectively. The squeeze-film damping and spring coefficients are given by $$\gamma = \frac{64\sigma P_a A}{\pi^6 d} \sum_{n=odd} \sum_{m=odd} \frac{m^2 + c^2 n^2}{(mn)^2[(m^2 + c^2 n^2) + \sigma^2/\pi^4]}, \quad \text{and}$$

$$k_{gs} = \frac{64\sigma^2 P_a A}{\pi^6 d} \sum_{n=odd} \sum_{m=odd} \frac{m^2 + c^2 n^2}{(mn)^2[(m^2 + c^2 n^2) + \sigma^2/\pi^4]}.$$

where $P_a$ is the ambient pressure, A=Lw, and c=w/L, and m and n are summation indices. The parameter σ is given by $$\sigma = \frac{12 \mu_{eff} w^2}{P_a d^2} \omega,$$

where $\mu_{eff}$ is the effective viscosity of the gas, ω=2πf, and f is the frequency of oscillation of the deformable portions 26 of elongated ribbon elements 23 (see T. Veijola, H. Kuisma, T. Ryhanen, "Equivalent-circuit model of squeezed gas film in a silicon accelerometer," Sensors and Actuators A 48, 1995).

After the deformable portions 26 of the elongated ribbon elements 23 have been pulled down, the voltage V is set to zero, and the response of the deformable portions 26 of the elongated ribbon elements 23 is governed by the equation $$\frac{d^2 y}{dt^2} + \gamma \frac{dy}{dt} + (K_s + k_{gs})y = 0,$$

The solution of this equation for a damped response is of the form $$y(t) = R \exp(-\gamma t/2m)\cos(\beta t - \delta),$$

where R is the amplitude of oscillation, γ is a damping coefficient, δ is a phase factor and $$\beta = \frac{[4(K_s + k_{gs})m - \gamma^2]^{1/2}}{2m}.$$

It is instructive to note that because of the functional form of γ, $k_{gs}$ and $K_s$, the response of the deformable portions 26 of the elongated ribbon elements 23 depends in a complex way on numerous device parameters including the dimensions and material properties of the deformable portions 26, the gas in the channel 25, the channel height h, and the ambient temperature and pressure. Therefore, in general, it is difficult to determine specific values for the device parameters that render a desired frequency response of the self-damped electromechanical conformal grating 100. For low frequency applications, with data rates in the 100 kHz range, there is a relatively wide range of viable parameter values that render the electromechanical conformal grating 100 self-damped. Therefore, it is relatively easy to design and fabricate a self-damped electromechanical conformal grating 100 for low frequency applications.

For high-frequency applications, with data rates greater than 2 MHz, the range of viable parameters is limited and difficult to determine. For such applications, the oscillation of the deformable portions 26 of the elongated ribbon elements 23 must be kept to a minimum to avoid data errors. Specifically, any oscillation of the deformable portions 26 of the elongated ribbon elements 23 about their equilibrium position gives rise to an output signal. Moreover, if an oscillation is of sufficient amplitude, it will register as a data bit error. The criteria for an optical data modulation system that is viable for data rates above 2 MHz are as follows: The self-damped electromechanical conformal grating 100 must be capable of producing a pulse of modulated light of intensity of constant amplitude $I_m$ that has a temporal duration $\pi \leq 250$ ns. Moreover any undesired oscillations of the deformable portions 26 of the elongated ribbon elements 23 must be limited so that the intensity of the modulated light resulting from such oscillations is less than 20% of $I_m$. That is, the deformable portions 26 of the elongated ribbon elements 23 must be being sufficiently damped to minimize the introduction of data errors into the modulated light beam.

Figure 6A:
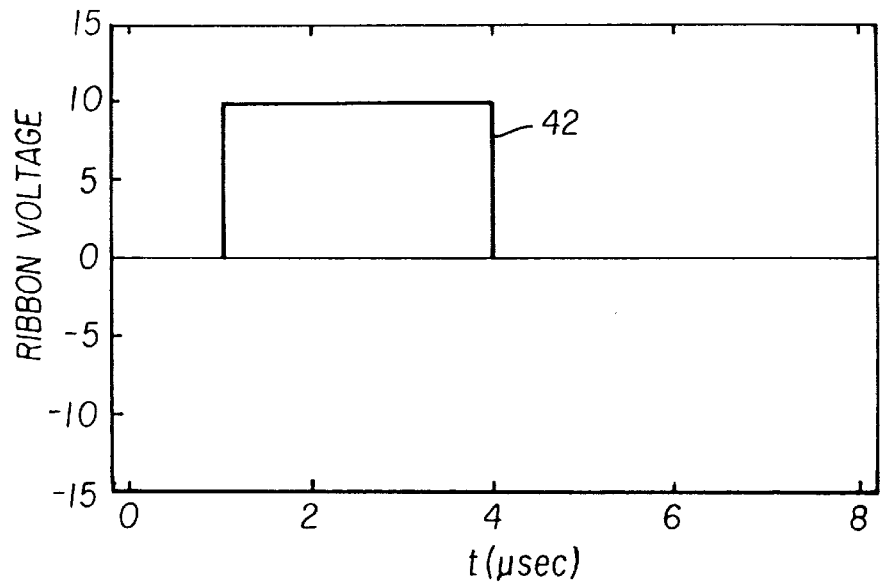
FIGS. 6a, 6b and 6c show an activation voltage pulse, ribbon displacement, and modulated light intensity into the 0'th order for an underdamped electromechanical conformal grating, respectively.
Figure 6B:
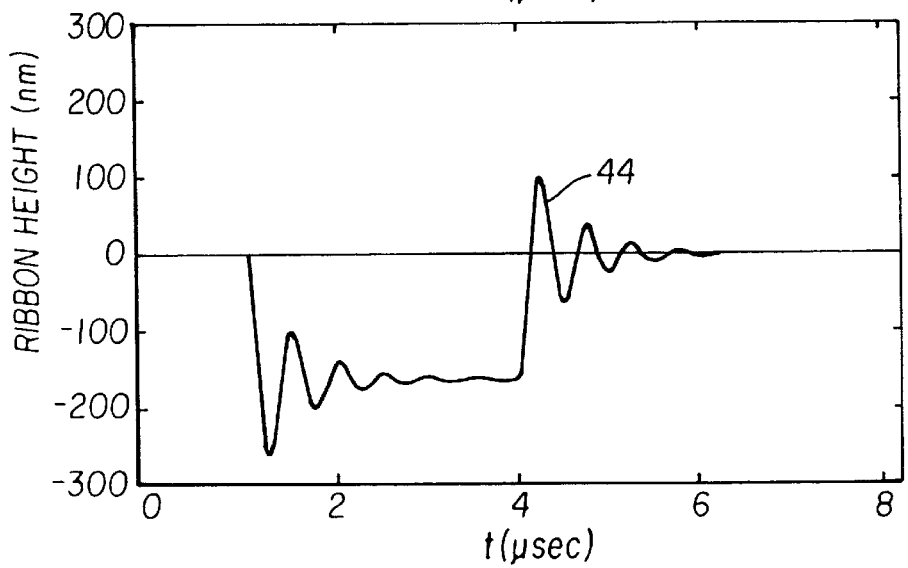
Figure 6C:
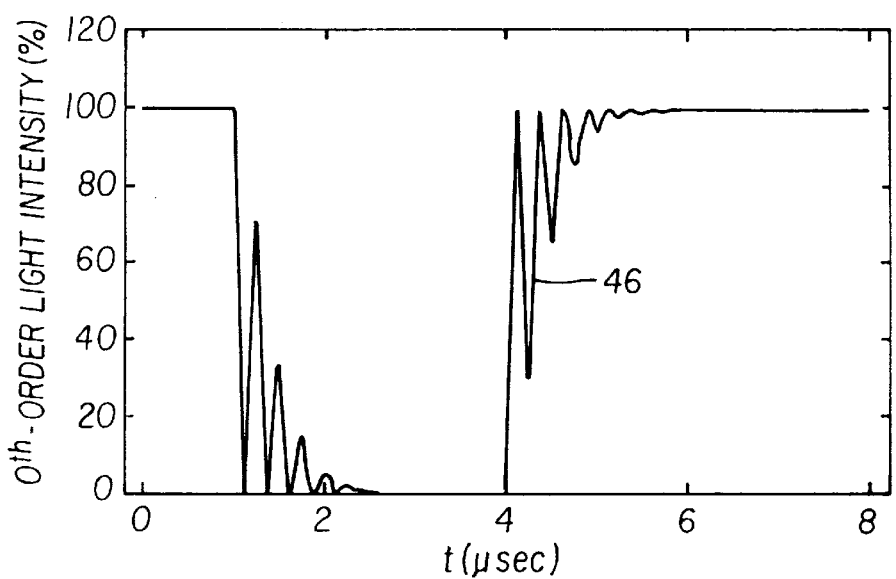

FIGS. 6a, 6b and 6c illustrate the activation and response of an underdamped electromechanical conformal grating. Specifically FIGS. 6a, 6b and 6c show plots of an activation voltage pulse 42, ribbon displacement 44, and modulated light intensity 46 into the 0'th order for an underdamped electromechanical conformal grating. The underdamped electromechanical conformal grating has substantially the same structure and operation as the self-damped electromechanical conformal grating 100 except that the deformable portions 26 of the elongated ribbon elements 23 tend to ring (oscillate) upon activation as described above. FIG. 6a shows an input voltage pulse 42 that is applied between the bottom conductive layer 12 and the reflective conductive layer 22 on the elongated ribbon elements 23. FIG. 6b shows the response of the deformable portions 26 of the elongated ribbon elements 23 the input voltage pulse 42 of FIG. 6a. Specifically, it shows the displacement 44 of the center point the deformable portions 26 of the elongated ribbon elements 23. FIG. 6c shows a profile of the modulated light intensity 46 into the 0'th order. The 0'th order corresponds to the modulated reflected light. It is instructive to note that the modulated light intensity 46 of an underdamped electromechanical conformal grating is characterized by an oscillatory temporal variation due to the ringing of the underdamped the deformable portions 26 of the elongated ribbon elements 23. This oscillatory temporal variation is undesired for high-frequency optical data modulation because it causes data errors.

Figure 7A:
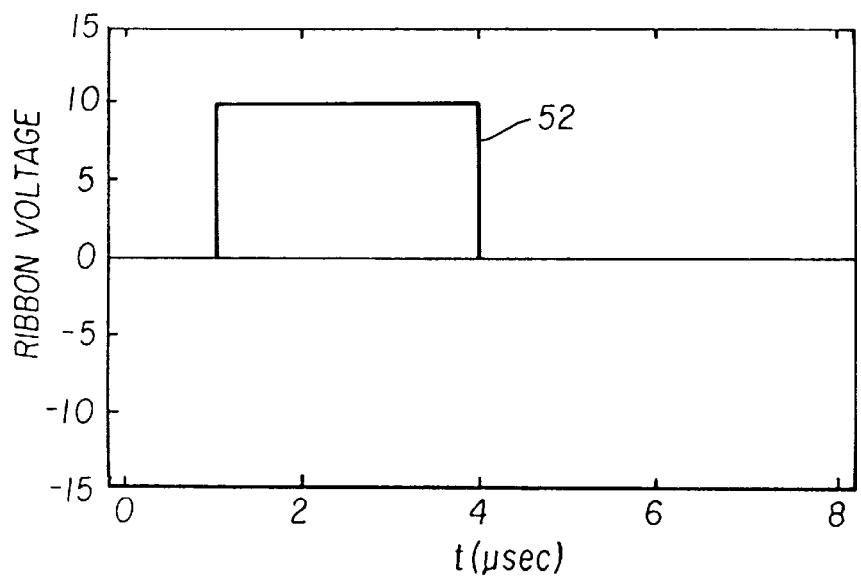
FIGS. 7a, 7b and 7c show an activation voltage pulse, ribbon displacement, and modulated light intensity into the 0'th order for a self-damped electromechanical conformal grating, respectively.
Figure 7B:
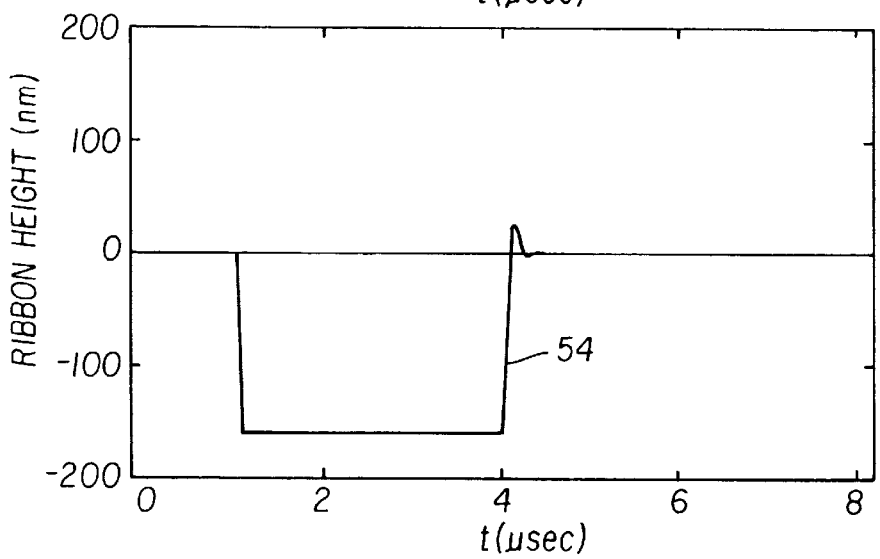
Figure 7C:
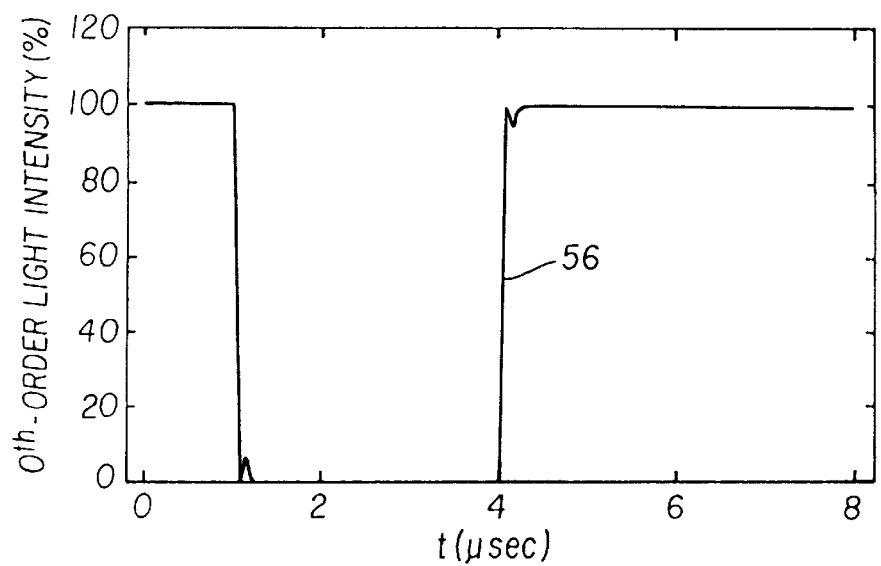

FIGS. 7a, 7b and 7c illustrate the activation and response of a self-damped electromechanical conformal grating 100. Specifically, FIGS. 7a, 7b and 7c show plots of an activation voltage pulse 52, ribbon displacement 54, and modulated light intensity 56 into the 0'th order for a self-damped electromechanical conformal grating 100, respectively. FIG. 7a shows an input voltage pulse 52 that is applied between between the bottom conductive layer 12 and the reflective conductive layer 22 on the elongated ribbon elements 23. FIG. 7b shows the response of the deformable portions 26 of the elongated ribbon elements 23 to the input voltage pulse 52 of FIG. 6a. Specifically, it shows the displacement of the center the deformable portions 26 of the elongated ribbon elements 23. FIG. 7c shows a profile of the modulated light intensity 56 into the 0'th order that is generated by a self-damped electromechanical conformal grating 100 in response to the input voltage pulse 52. It is instructive to note that the modulated light intensity 56 of the self-damped electromechanical conformal grating 100 exhibits a minimal temporal oscillation of the modulated light. This is desired for high-frequency optical data modulation because it provides an error free representation of the input data stream 160.

A self-damped electromechanical conformal grating 100 for use at a 2 MHz data rate was fabricated with the following materials and parameters:

Substrate: silicon

Spacer layer: silicon dioxide, thickness h=150 nm

Ribbon layer: silicon nitride, thickness=120 nm, tensile stress=1100 Mpa

Reflective and conductive layer: aluminum, thickness=50 nm

Grating period Λ=36 μm

Length of deformable portions of elongated ribbon elements=30 μm

Width of elongated ribbon elements w=4 μm

Width of intermediate supports=6 μm

The gas in the channel 25 is air at standard temperature and pressure, which simplifies device packaging. Modification of the gas type, temperature and pressure can be used to increase damping, but requires more complex and expensive packaging. The fabricated self-damped electromechanical conformal grating 100 functions in contact mode, whereby the deformable portions 26 of the elongated ribbon elements 23 are displaced vertically by 150 nm when actuated, and make mechanical contact with the bottom of the channel 25. The self-damped electromechanical conformal grating 100 is preferably of this contact-mode type. For optimum diffraction efficiency, the vertical displacement upon actuation needs to be approximately ¼ of the wavelength of the incident light 112.

This type of design allows for fabrication with CMOS methods and integration with CMOS circuitry. The resonant frequency of the deformable portions 26 of the elongated ribbon elements 23 in this particular design is approximately 8 MHz. Most practical designs have resonant frequencies between 2 MHz and 15 MHz. Because of this high resonance, the switching time of the device can be very short.

Figure 8:
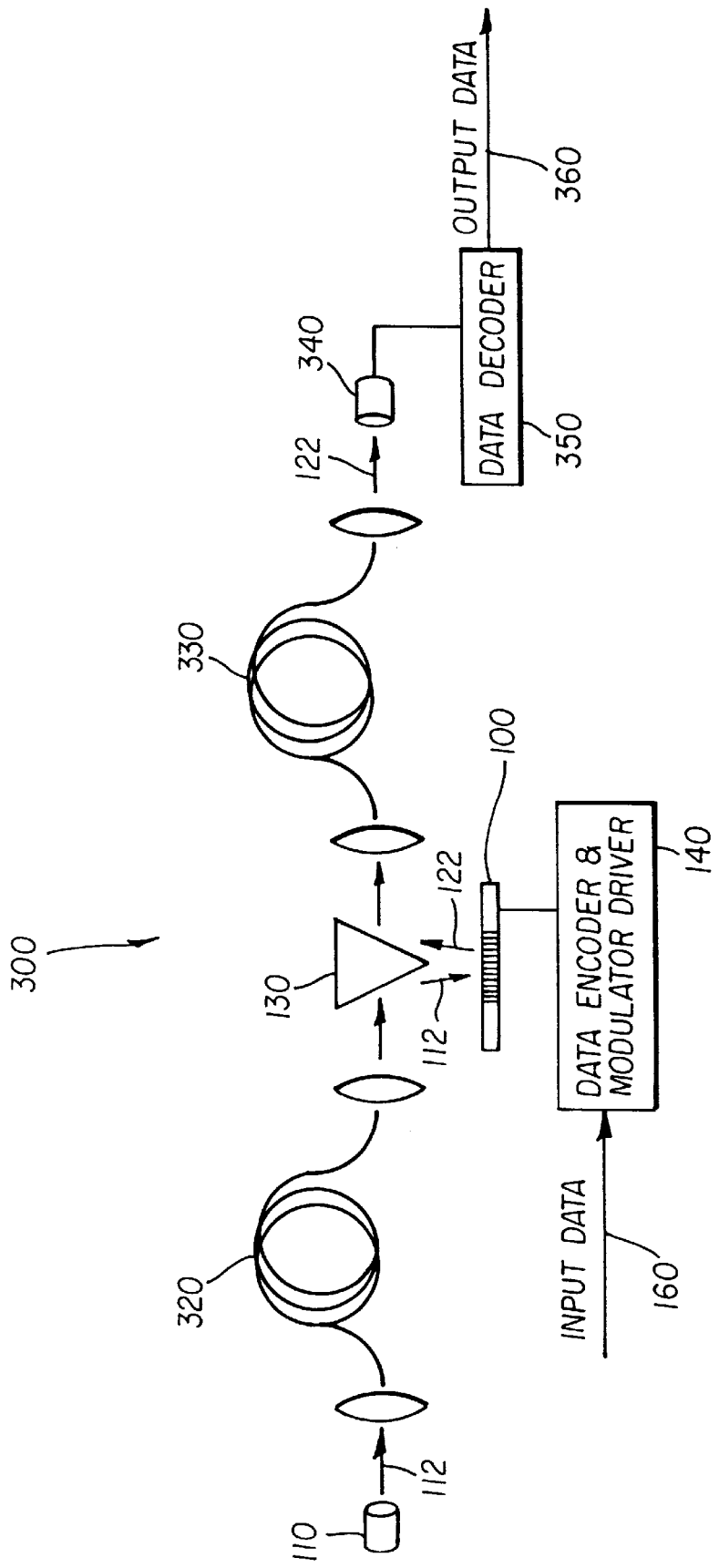
FIG. 8 is a schematic of an alternate embodiment of an optical data modulation system, which is used for optical data transmission.

FIG. 8 is a schematic of an alternate embodiment of optical data modulation system in which it is used for optical data transmission. The optical data modulation system 300 includes a light source 110, a light transmission system 320, a light directing element 130, a data encoder and modulator driver 140, and input data stream 160, a self-damped electromechanical conformal grating 100, a light transmission system 330, a light sensor 340, and a data decoder 350. The light source 110 is preferably a laser or LED. The light directing element 130 is preferably a mirrored prism, the light transmission systems 320 and 330 are preferably optical fiber systems, and the light sensor 340 is preferably a photodiode.

The operation of the optical data modulation system 300 is as follows: Light 112 from the light source 110 is transmitted by the light transmission system 320 onto the light directing element 130 which directs the light 112 unto the self-damped electromechanical conformal grating 100. The data encoder and modulator driver 140 activates the self-damped electromechanical conformal grating 100 to modulate the incident light in accordance with an input data stream 160. The modulated light 122 leaves the self-damped electromechanical conformal grating 100 and is incident on the light directing element 130. The light directing element 130 directs the modulated light 122 onto the light transmission system 330. The light transmission system 330 directs the modulated light 122 onto a light sensor 340. The light sensor 340 outputs data into a data decoder 350 which outputs the decoded data in the form of and output data stream 360 for use in a variety of optical transmission and communications equipment.

The invention has been described in detail with particular reference to certain preferred embodiments thereof, but it will be understood that variations and modifications can be effected within the spirit and scope of the invention.

PARTS LIST

| | |
|---|---|
| 5a | conformal grating element |
| 5b | conformal grating element |
| 5c | conformal grating element |
| 5d | conformal grating element |
| 10 | substrate |
| 12 | bottom conductive layer |
| 14 | protective layer |
| 16 | standoff layer |
| 18 | spacer layer |
| 20 | ribbon layer |
| 22 | reflective conductive layer |
| 23a | elongated ribbon element |
| 23b | elongated ribbon element |
| 23c | elongated ribbon element |
| 23d | elongated ribbon element |
| 24a | end support |
| 24b | end support |
| 25 | channel |
| 26 | deformable portion |
| 27 | intermediate support |
| 28 | gap |
| 29 | standoff |
| 30 | incident light beam |
| 32 | reflected light beam |
| 35a | +1$^{st}$ order beam |
| 35b | −1$^{st}$ order beam |
| 36a | +2$^{nd}$ order beam |
| 36b | −2$^{nd}$ order beam |
| 42 | activation voltage pulse |
| 44 | underdamped ribbon displacement |
| 46 | underdamped modulated light intensity |
| 52 | activation voltage pulse |
| 54 | self-damped ribbon displacement |
| 56 | self-damped modulated light intensity |
| 100 | self-damped electromechanical conformal grating |
| 110 | light source |

PARTS LIST -continued

| | |
|---|---|
| 112 | incident light |
| 120 | optical system |
| 122 | modulated light |
| 130 | light directing element |
| 140 | data encoder and modulator driver |
| 150 | optical system |
| 160 | input data stream |
| 180 | optical data modulation system |
| 200 | light utilization device |
| 300 | optical data modulation system |
| 320 | light transmission system |
| 330 | light transmission system |
| 340 | light sensor |
| 350 | data decoder |
| 360 | output data |

What is claimed is:

1. A system for modulating a beam of light in accordance with an input data stream having a data rate greater than 2 MHz, comprising:

(a) a source of light for directing light along a predetermined path;

(b) a self-damped electromechanical conformal grating disposed in the predetermined path, the self-damped electromechanical conformal grating including:

(i) an elongated ribbon element including a light reflective surface, (ii) a substrate and a pair of end supports for supporting the elongated ribbon element at both ends over the substrate; and (iii) at least one intermediate support between the end supports so that there are deformable portions of the elongated ribbon element above and movable into a channel containing a gas; and (c) means responsive to the input data stream for applying forces to the elongated ribbon element to cause the deformable portions of the elongated ribbon element to move into the channel so that the deformable portions of the elongated ribbon element are movable between first and second positions in accordance with the input data stream; and (d) the self-damped electromechanical conformal grating modulating the light beam and directing the modulated light to a light utilization device where the modulated light can be recorded or decoded, the deformable portions of the elongated ribbon element being sufficiently damped to minimize the introduction of data errors into the modulated light beam.

2. The system of claim 1 wherein the light utilization device includes a data recorder including a movable light sensitive surface which records data in response to the modulated light.

3. The system of claim 2 wherein the light utilization device includes an optical detection means for receiving the modulated light and producing output data demodulated from the modulated light beam.

4. The system of claim 1 wherein the gas is under standard atmospheric pressure and temperature.

5. The system of claim 1 wherein the deformable portions of the elongated ribbon element have a width of 4 microns.

6. The system of claim 1 wherein the deformable portions of the elongated ribbon element make mechanical contact with the bottom of the channel when actuated.

* * * * *